Nov. 10, 1959
L. PERAS
2,912,125
AUTOMATIC HANDLING DEVICE
Filed July 1, 1957
3 Sheets-Sheet 1
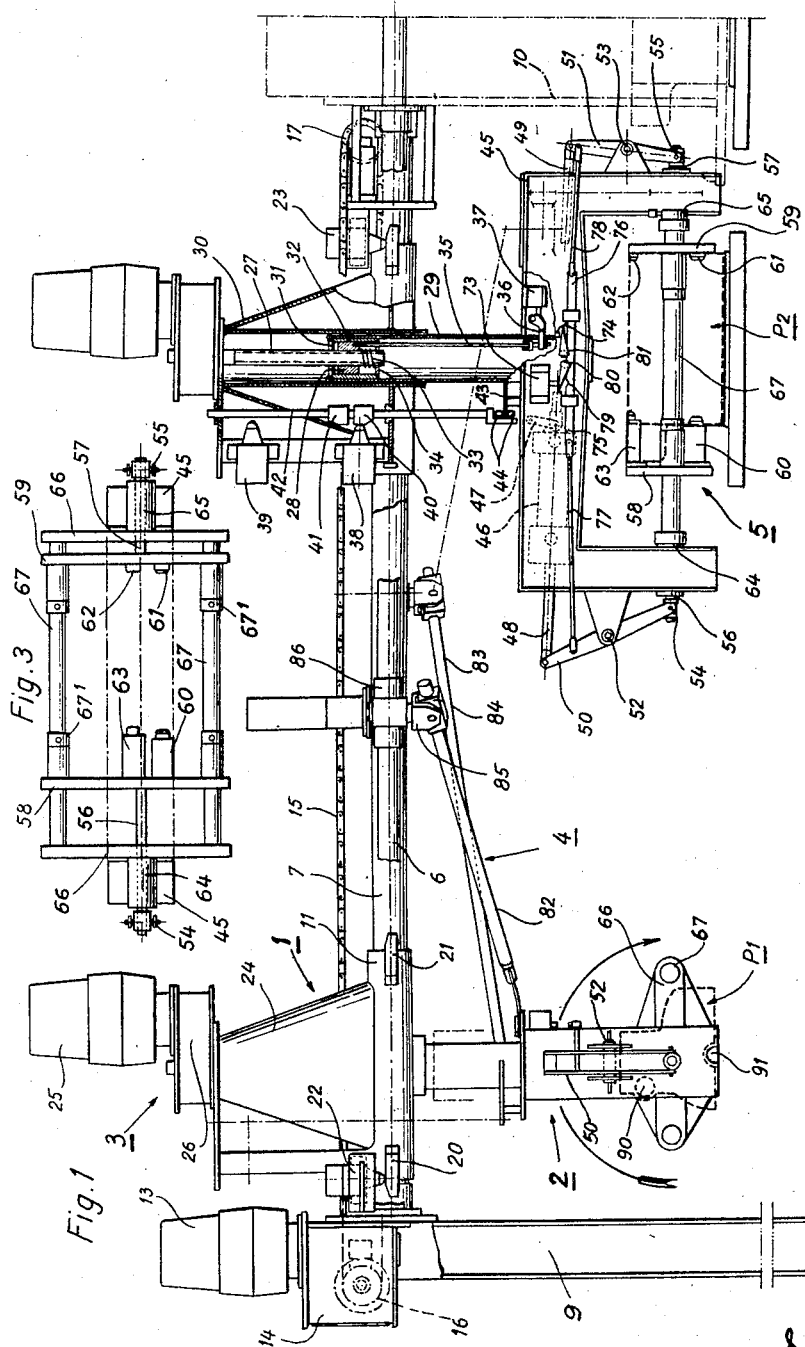
Inventor
Lucien Peras
by
Stevens, Davis, Miller & Mosher
his attorneys

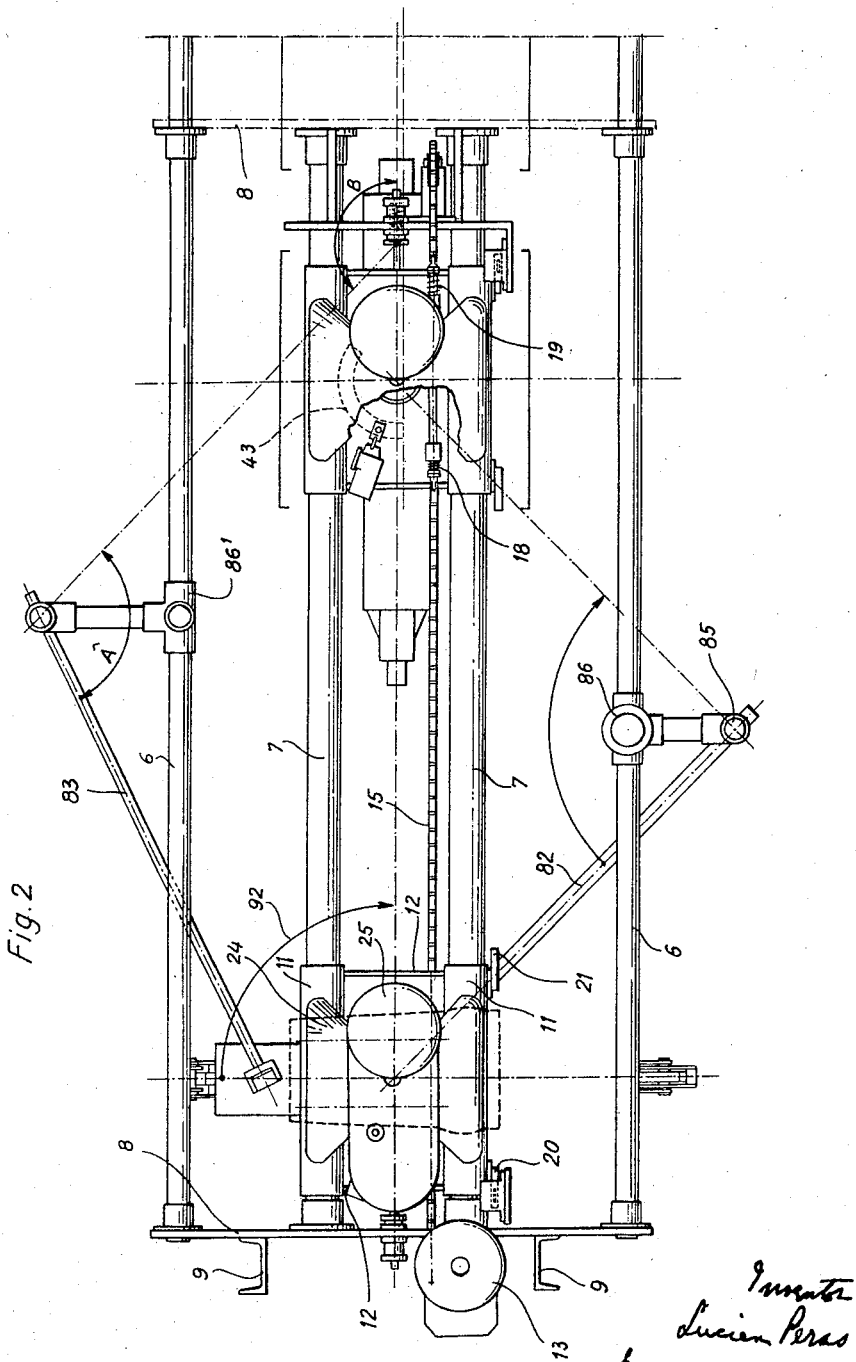

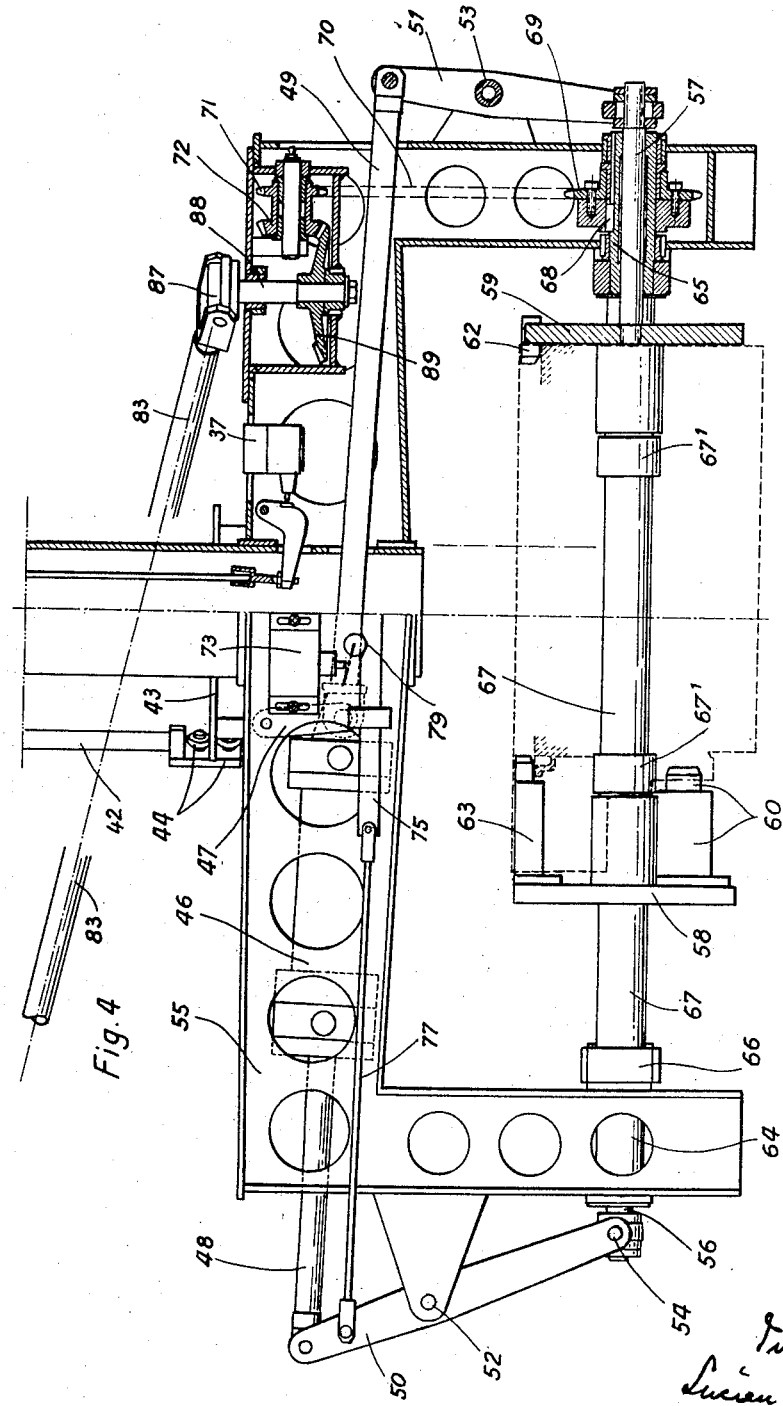

United States Patent Office 2,912,125
Patented Nov. 10, 1959

2,912,125

AUTOMATIC HANDLING DEVICE

Lucien Peras, Billancourt, France, assignor to Regie Nationale des Usines Renault, Billancourt, France Application July 1, 1957, Serial No. 669,200

Claims priority, application France July 27, 1956

5 Claims. (Cl. 214—1)

It is often necessary to modify the orientation of a work-piece during the course of manufacture, for example between two machining or assembly stations, in order to permit or to facilitate the execution of the operations to be carried out on the different faces of the work-piece.

This requirement of manufacture very frequently necessitates recourse to manual handling.

The present invention has precisely for its object the provision of an automatic handling device which by itself alone is capable of various possibilities, in that it enables a work-piece to be conveyed from one point to another and to orientate it during the course of this movement, about two axes at right angles to each other.

To this end, the invention consists essentially in the provision of an apparatus, called a trolley, adapted to make a horizontal lateral movement and which carries a work-carrier which is capable of seizing the work-piece, and comprises in addition a lifting and lowering mechanism, in order to effect the desired movement of the work-piece between two predetermined points, while freeing the piece from its temporary support so as to place it on another.

In a complementary way, and in order to modify simultaneously the orientation of the work-piece, the work-carrier is made capable of movement about a vertical axis and comprises a pair of jaws for gripping the work-piece, the said jaws being orientatable about a horizontal axis.

Finally, as will be explained in more detail below, the method of construction of the orientating mechanism of the work-carrier and of the gripping jaws enables the movement of translation of the piece to be combined with rotational movements of the desired amplitude, thus giving the device in accordance with the invention very wide possibilities of use.

The special features of the invention will however become more clearly apparent from a form of embodiment which will now be described by way of example, within the framework of automatic handling of a cylinder block of an automobile engine, which is carried during the course of machining from the output side of one automatic machine to the input side of the machine following.

In the accompanying drawings:

Fig. 1 is a view in elevation of the general arrangement of the device, in which the trolley and the work-carrier are shown in two characteristic positions.

Fig. 2 is a view looking from above on the apparatus shown in Fig. 1.

Fig. 3 is a plan view of a part of the jaws and of their mounting in the work-carrier.

Fig. 4 is a detail view in elevation, with a partial cross-section, of the trolley and the work-carrier.

Referring now to Fig. 1, and considering the device in its broad outlines, there can first be seen the trolley 1 having a guided horizontal movement and supporting the work-carrier 2 for the cylinder block, which is shown in a position P1 on the left-hand side of the figure.

This trolley 1 supports in addition a lifting and lowering mechanism 3 for the work-carrier 2, the latter being movable about its vertical and horizontal axes by virtue of a system 4 of orientating arms. There is also shown on the right-hand side of the figure, and in the final position P2 of the orientated block, the gripping jaws 5 of the work-carrier 2, orientatable about a horizontal axis.

From Figs. 1 and 2, it can be seen that the general assembly of the device is carried by a framework of rectangular form, constituted as to its length by two tubes 6 which are coupled (as are also the tubes 7 which support and guide the trolley 1) to two cross members 8 carried by the pillars 9 and 10.

The trolley 1 is slidably mounted on the tubes 7 by means of sleeves 11 connected together by two cross-braces 12. It receives its lateral movement from a unit comprising a motor 13 and reduction gear 14 by means of a chain 15 which engages with the driving and driven pinions 16 and 17, and drives it in one direction or in the other through the medium of an elastic transmission with springs 18 and 19, which are preferably provided in view of the inertia of the moving assembly of the device. This elastic transmission is also provided with the object of taking-up the play in the transmission and to prevent the application of any abnormal stress on the chain in case the motor 13 is not stopped exactly at the correct moment.

The trolley is provided with cams 20 and 21, fixed on one of its sleeves 11 so as to actuate, in its extreme positions, fixed contactors 22 and 23. It carries in addition, through the medium of a frame 24, the lifting and lowering mechanism 3 which is connected to the work-carrier 2 in the manner described below. This mechanism 3 comprises essentially an electric motor 25 which can drive in rotation, through a reduction gear 26, a threaded rod 27, with the rod co-operating with a nut 28 forming part of the work-carrier. This nut 28 is housed in the hollow rod guide 29 of the work-carrier and is slidably mounted in a fixed cylinder 30 carried by the trolley and permitting at the same time a pivotal movement and vertical sliding action of the work-carrier. The latter is supported on the nut 28 by a small plate 31 which closes the hollow rod 29 around the threaded rod 27.

In order to convert the movement of rotation of the rod 27 to a linear movement of the work-carrier, the nut 28 is held fixed for rotation by an assembly of splines in the sleeve 32 which is rigidly fixed to the hollow rod 29. These vertical splines (not shown) are also provided in such manner as to permit of a vertical sliding action of the nut 28 in its sleeve, this movement being however limited by a spring 33 which is supported on the lower plate 34 of the sleeve 32. This mounting enables the nut 28 (in an eventuality which will be described with the operation of the whole unit) to actuate by means of its rod 35 sliding in the plate 34, the operating cam 36 of a contactor 37 fixed to the work-carrier.

Two other contactors 38 and 39 fixed on the trolley are arranged so as to be operated following the vertical movement of the work-carrier, by means of cams 40 and 41, fixed on the rod 42 which is slidably mounted in the body of the trolley. Since the work-carrier is orientatable along the axis of its rod 29, the latter is provided for that purpose with a circular motor 43 which can slide between two rollers 44 carried by the sliding rod 42.

The work-carrier 2 comprises an armature 45 of inverted U-shape, rigidly coupled to the hollow rod-guide 29 and mainly carrying the operating mechanism for the jaws 5.

This mechanism comprises a jack 46 fixed on the armature 45 by an oscillating connecting-rod 47 and to this jack are connected the piston-rod 48 and a connecting-rod 49, articulated on the body of the apparatus. These members 48 and 49 are pivotally mounted on the crank-arms 50 and 51 which are also pivotally mounted on fixed pivots 52 and 53 and are connected by means of forks 54 and 55 to the shafts 56 and 57 which control the movement of the jaws.

The length of these crank-arms is chosen in such manner as to regulate the displacement of the shafts 56 and 57, which may be different as in the present case.

These shafts carry at their extremities end-cheeks 58 and 59, on which are fixed the jaws 60, 61, 62 and 63. They are slidably mounted in the sleeves 64 and 65 which are fixed on the cross-members 66 of a rigid frame, on the tubes 67 of which the end-cheeks 58 and 59 can also slide up to the stops $67^1$ (see Fig. 3). These sleeves are themselves slidably mounted in the armature 45 of the work-carrier, in order that rotation of the said rigid frame may permit rotation of the jaws, the operating shafts of which can also rotate in the forks 54 and 55.

This rotation of the frame is impressed on the sleeve 65, on which is keyed at 68 a toothed wheel 69, by means of a chain 70 which engages also with a toothed wheel 71 rigidly fixed to a conical pinion 72 (see Fig. 4). The method of driving this pinion will be explained later during the description of the operation.

The articulated operating mechanism for the jaws (see Fig. 1) also comprises members intended to operate contactors 73 and 74 at the limit of travel of the jaws in one direction or in the other, with a view to starting the following phase of the cycle of operation.

These members comprise two guided rods 75 and 76, mounted side by side and connected by pivoted rods 77 and 78 to the crank-arms 50 and 51. These rods are each provided with two slots 79 arranged in such manner that at the desired end positions of the jaws, one series of slots or the other is located in coincidence under the rollers of the operating cams 80 and 81 of the contactors 73 and 74.

The movement of rotation of the work-carrier about the axis of its guide-rod 29 is controlled by the orientating arm 82 which intervenes during the course of the lateral movement which it receives from the trolley. This arm 82 is rigidly fixed at one extremity to the armature of the work-carrier. Its other extremity is slidably mounted in a pivoted guide 84 carried by a forked member 85 pivotally mounted on a support 86 which is adjustably fixed on one of the tubes 6 of the armature of the device.

On the other hand, the arm 83 (see Fig. 4) is connected at one extremity by a pivoted joint 87 of the cardan type to the shaft 88 which is supported by the armature of the work-carrier and keyed in a conical pinion 89 which engages with the pinion 72. The other extremity of this arm 83 is mounted in a similar way to the arm 82 in a support $86^1$.

The operation of the device is as follows:

The trolley being in the position at the left-hand side of Fig. 1, the motor 25 is started-up in order to control the downward movement of the work-carrier, for example when the block P which has been brought up is stopped in the position P1, actuating a contactor (not shown). The threaded rod 27 is driven in rotation in the direction which moves the nut 28 downwards, and with it the work carrier which this nut supports through the small plate 31.

When the cam 40 actuates the contactor 38, the latter causes the motor 25 to stop and sets the jack 46 into action in the direction of closure of the gripping jaws. During the course of this movement, the block P is centered in the jaws by the housings 90 and 91 which receive the jaws and which are given a frustoconical shape at their extremities. The end cheeks of the jaws, the travel of which is especially regulated by the stops $67^1$ as a function of the depths of the cavities of the block in which the jaws 60, 61, 62 and 63 are engaged, then move inwards to grip the block. It can be seen that the gripping points employed, in the present example the housings 90 and 91, correspond in this case to the openings of the cam shaft and the bearings.

At the end of the movement, one series of the slots 79 in the rods 75 and 76 come into coincidence under the roller of the cam 80 and the latter actuates the contactor 73 which causes the work-carrier to move upwards again.

This movement of the work-piece is effected by the means already described, the threaded rod 27 of the lifting and lowering mechanism being driven in the opposite direction. At the end of travel of the work-carrier, the cam 41 actuates the contactor 39 which causes the motor 25 to stop and starts up the motor 13. Through the intermediary of the chain 15, the motor 13 then drives the trolley in its lateral movement towards the right-hand position of Fig. 1.

During the course of this movement, the sliding arm 82 has pivoted, in the example considered, by 90° about the shaft 85 of its support 86 (see Fig. 2). As this arm is fixed in a rigid manner on the armature of the work-carrier, it causes the latter to pivot by an equivalent amount in the direction of the arrow 92.

During this lateral and rotating movement of the work-carrier, the arm 83 has pivoted through an angle A about the axis of its support $86^1$. The result is that, as a consequence of the combination of the movement of the arms 83 and 82, the shaft 88 is driven through $90°+A$ in rotation relative with respect to the work-carrier. Through the medium of the pinions 89 and 72 and the toothed wheels 69 and 71, this rotation enables the sleeve 65 to rotate, this sleeve being rigidly fixed to the non-deformable frame, on which the cheeks of the jaws are mounted, by an amount determined by the choice of the ratio between the pinions and the toothed wheels. It can be seen from Fig. 4 that this ratio has been chosen so as to turn the work-piece over by a rotation of 180° of the unit comprised by the frame and the jaws.

When the trolley arrives at its extreme right-hand position (see Fig. 1), the cam 21 actuates the contactor 23 which stops the motor 13 and again starts up the motor 25. The latter controls the downward movement of the work-carrier in the way already indicated. The cam 40 then again operates the contactor 38 which stops the motor 25 and also brings into action the jack 46. The latter then causes the cheeks of the jaws to open, the jaws then leaving the suitably orientated block on its waiting support in the position P2.

When during the course of the opening movement of the jaws the other series of slots 79 in the rods 75 and 76 coincide under the roller of the cam 81, the latter actuates the contactor 74 which produces the upward movement of the work-carrier.

Finally, the trolley and work-carrier assembly is brought back to its initial waiting position by the action of the contactors 39 and 22.

If during the course of one of its downward movements the work-carrier encounters an abnormal resistance, for example due to a cylinder block which has not been removed from the position P2, a safety device is provided to stop the operation of the apparatus.

It will, in fact, be appreciated that in case of a premature stop of the work-carrier in its downward movement, the nut 28, which is mounted to slide vertically, will continue to move downwards and will compress the spring 33, its rod 35 then actuating the operating cam 36 of the safety contactor 37.

It will of course be understood that the present form of embodiment has been described in particular by way of indication only, and any person skilled in the art will be able to envisage alternative forms which will fall within the scope of the invention.

I claim:

1. An automatic handling device for moving workpieces during the course of their manufacture in a lateral movement coupled with two separate rotational movements about two axes at right angles to each other; said device comprising a frame, a horizontal guide means, a trolley mounted on the guide means for movement between two predetermined positions, a prime mover, means drivingly connecting the prime mover to the trolley, vertical guide means on the trolley, a work-carrier, means mounting the work-carrier on the vertical guide means for vertical sliding and pivotal movement, a lifting and lowering mechanism carried by the trolley and connected to the work-carrier for sliding and pivotally moving it vertically, a supporting framework, support means for said framework mounted on the work-carrier, said framework being mounted on the support means for movement about a horizontal axis, plates carried by the framework and slidable relative thereto, a plurality of work-piece gripping jaws carried by the plates, an operating mechanism for sliding the plates, a pair of orientating arms movably carried by the work-carrier and laterally opposed with relation to the lateral movement of the trolley and arranged substantially horizontally, said arms being slidably and pivotally mounted, each at one of their respective extremities, in the horizontal and vertical planes with respect to the longitudinal axis of the frame and the movement of the trolley, one of said arms being rigidly coupled to said work-carrier at its other extremity so as to control the rotation of the work-carrier in its vertical guide means during the movement of the trolley, the other arm having its other extremity coupled to a gear mechanism so as to rotatably drive the framework and said jaws during the movement of translation and contactors disposed to arrest each cycle of operation and to initiate the subsequent phase of each cycle.

2. A device as claimed in claim 1, wherein the orientating arm for effecting the rotation of the framework cooperates through a cordan coupling with a countershaft of the gear mechanism, said framework having a horizontal rotation shaft means being constituted by two sleeves and an inverted U-shaped armature on the work-carrier and in which the sleeves are freely mounted for rotation.

3. A device as claimed in claim 2, wherein the plates of the gripping jaws are slidably mounted for movement along the axis of rotation of the framework, an operating shaft for each plate slidably mounted in the sleeves, said shafts being coupled externally to the limbs of the armature, connecting rods coupled loosely to each shaft, said connecting rods being pivotally mounted at one extremity on the armature, a jack having a moving portion coupled to the other extremities of the connecting rods, a further connecting rod pivotally mounted on the body of the jack with said body being arranged substantially horizontally and an oscillating crank rod coupling the jack body to the work-carrier.

4. A device as claimed in claim 3, wherein said lifting and lowering mechanism of the work-carrier comprises a rotatable threaded rod, an internally threaded nut engaging the rod and rotatably housed in a guiding rod in the work-carrier, and a safety device operative to halt all operations of the device when an abnormal resistance is encountered by the work-carrier during its travel.

5. A device as claimed in claim 4, wherein said safety device includes a splined mounting for the exterior of the nut inside the guide rod and a compression spring operatively associated with a free extremity of the nut so that the nut is capable of a limited vertical sliding movement inside the guide rod and contacts provided at the limits of the vertical movement and adapted to stop the cycle of operation.

References Cited in the file of this patent
UNITED STATES PATENTS

| | | |
|---|---|---|
| 507,303 | Aiken | Oct. 24, 1893 |
| 2,040,028 | Smith et al. | May 5, 1936 |
| 2,390,293 | Colson | Dec. 4, 1945 |